(12) United States Patent
Carmona et al.

(10) Patent No.: US 10,402,761 B2
(45) Date of Patent: Sep. 3, 2019

(54) METHOD OF ASSEMBLING ORDERS, AND PAYMENT TERMINAL

(71) Applicant: VEOVOX SA, Pully (CH)

(72) Inventors: Jorge Carmona, Pully (CH); Isabelle Vez, Pully (CH); Firinde Teylouni, Blonay (CH); Rafael Elena, Málaga (ES)

(73) Assignee: VEOVOX SA, Pully (CH)

( * ) Notice: Subject to any disclaimer, the term of this patent is extended or adjusted under 35 U.S.C. 154(b) by 509 days.

(21) Appl. No.: 14/902,125

(22) PCT Filed: Jul. 4, 2014

(86) PCT No.: PCT/EP2014/064369
§ 371 (c)(1),
(2) Date: Feb. 22, 2016

(87) PCT Pub. No.: WO2015/001105
PCT Pub. Date: Jan. 8, 2015

(65) Prior Publication Data
US 2016/0210582 A1    Jul. 21, 2016

(30) Foreign Application Priority Data

Jul. 4, 2013    (CH) ..................... 1204/13

(51) Int. Cl.
*G06Q 10/06*    (2012.01)
*G06Q 10/08*    (2012.01)
(Continued)

(52) U.S. Cl.
CPC ... *G06Q 10/063118* (2013.01); *G06Q 10/087* (2013.01); *G06Q 30/0635* (2013.01); *G10L 17/04* (2013.01); *G10L 2015/223* (2013.01)

(58) Field of Classification Search
CPC .......... G10L 13/00–25/00; G06Q 10/00–50/00
(Continued)

(56) References Cited

U.S. PATENT DOCUMENTS 4,388,689 A * 6/1983 Hayman ................ G06Q 50/12
705/15
5,003,472 A * 3/1991 Perrill .................. G06Q 10/087
235/375
(Continued)

FOREIGN PATENT DOCUMENTS

EP       0 949 575 A1   10/1999
WO    WO-2008096141 A1 *  8/2008 ........... G06Q 10/103
(Continued)

OTHER PUBLICATIONS

Nov. 4, 2014 International Search Report issued in International Patent Application No. PCT/EP2014/064369.
(Continued)

*Primary Examiner* — Alan S Miller
(74) *Attorney, Agent, or Firm* — Oliff PLC

(57) ABSTRACT

Method of order assembly, including the following steps: a plurality of orders each including a plurality of articles are displayed successively or simultaneously on an assembly screen; team member from among a plurality of team members says the order on which he will work ("prepare orange order"), reads article identifications on the assembly screen, will pick the physical article or articles corresponding to these identifications and verbally designates these articles by means of voice commands; the designation of orders and of articles indicated by the team member as well as various commands said by the team member during the method of assembly are recognized by means of a voice
(Continued)

recognition system; the order concerned is updated on the assembly screen so as to indicate that the article or articles has or have been picked.

13 Claims, 11 Drawing Sheets

(51) Int. Cl.
   *G06Q 30/06* (2012.01)
   *G10L 15/22* (2006.01)
   *G10L 17/04* (2013.01)
(58) Field of Classification Search
   USPC .............................................. 705/7.11–7.42
   See application file for complete search history.

(56) References Cited

U.S. PATENT DOCUMENTS

| | | | | |
|---|---|---|---|---|
| 5,377,097 A * | 12/1994 | Fuyama | G06Q 10/087 235/383 |
| 5,509,538 A * | 4/1996 | Spindler | B65G 1/1376 198/370.01 |
| 5,589,676 A * | 12/1996 | Iguchi | G07G 1/00 235/7 R |
| 5,758,322 A * | 5/1998 | Rongley | G06Q 20/341 704/270 |
| 6,003,015 A * | 12/1999 | Kang | G06Q 10/087 312/100 |
| 6,035,399 A * | 3/2000 | Klemba | G06F 9/466 726/1 |
| 6,049,780 A * | 4/2000 | Fuyama | G06Q 10/087 235/7 R |
| 6,594,632 B1 * | 7/2003 | White | G10L 15/22 704/246 |
| 6,996,460 B1 * | 2/2006 | Krahnstoever | G06F 3/011 701/1 |
| 7,110,963 B2 * | 9/2006 | Negreiro | G06K 17/00 704/275 |
| 8,459,542 B2 * | 6/2013 | Koakutsu | G06Q 10/0832 235/375 |
| 9,318,103 B2 * | 4/2016 | Dines | G10L 15/02 |
| 9,424,602 B2 * | 8/2016 | Taniguchi | G06Q 30/0635 |
| 9,510,090 B2 * | 11/2016 | Lissek | H04M 1/035 |
| 2001/0018671 A1 * | 8/2001 | Ogasawara | G06Q 10/087 705/26.8 |
| 2002/0007315 A1 * | 1/2002 | Rose | G06Q 30/06 705/15 |
| 2002/0023005 A1 * | 2/2002 | Tanaka | G06Q 10/06 705/22 |
| 2002/0049598 A1 * | 4/2002 | Negreiro | G06K 17/00 704/275 |
| 2002/0072949 A1 * | 6/2002 | Araki | G06Q 10/06 705/7.13 |
| 2002/0174014 A1 * | 11/2002 | Wittrup | G06Q 10/06 705/15 |
| 2003/0018531 A1 * | 1/2003 | Mahaffy | G06Q 20/20 705/16 |
| 2003/0118197 A1 * | 6/2003 | Nagayasu | H04B 1/385 381/74 |
| 2003/0163386 A1 * | 8/2003 | Narita | G06Q 10/087 705/26.1 |
| 2004/0039628 A1 * | 2/2004 | Thompson | G06Q 10/0631 705/2 |
| 2004/0138925 A1 * | 7/2004 | Zheng | G06Q 10/06 705/2 |
| 2004/0143503 A1 * | 7/2004 | Suthar | G06Q 30/06 705/15 |
| 2004/0215455 A1 * | 10/2004 | Kemp | G10L 15/22 704/235 |
| 2004/0243471 A1 * | 12/2004 | Salmen | G06F 3/0481 705/15 |
| 2005/0021407 A1 * | 1/2005 | Kargman | G06F 3/0482 705/15 |
| 2005/0049940 A1 * | 3/2005 | Tengler | G06Q 10/087 705/21 |
| 2005/0165663 A1 * | 7/2005 | Razumov | G06Q 20/20 705/26.44 |
| 2007/0007331 A1 * | 1/2007 | Jasper | G06Q 20/20 235/379 |
| 2007/0040026 A1 * | 2/2007 | Vleet | G06Q 20/20 235/383 |
| 2007/0083443 A1 * | 4/2007 | Sacks | G06Q 10/087 705/28 |
| 2007/0088620 A1 * | 4/2007 | Tengler | G06Q 10/087 705/15 |
| 2008/0255837 A1 * | 10/2008 | Kahn | G10L 25/48 704/235 |
| 2008/0319864 A1 * | 12/2008 | Leet | G06Q 10/087 705/15 |
| 2012/0177295 A1 * | 7/2012 | Gronau | G06K 9/03 382/218 |
| 2012/0330653 A1 * | 12/2012 | Lissek | H04M 1/035 704/226 |
| 2013/0138515 A1 * | 5/2013 | Taniguchi | G06Q 30/0635 705/15 |
| 2013/0146652 A1 * | 6/2013 | Koakutsu | G06Q 10/0832 235/3 |
| 2013/0166279 A1 * | 6/2013 | Dines | G10L 15/02 704/8 |
| 2014/0244252 A1 * | 8/2014 | Dines | G10L 15/183 704/235 |
| 2014/0351101 A1 * | 11/2014 | Danelski | G06Q 10/087 705/28 |
| 2016/0062473 A1 * | 3/2016 | Bouchat | G06F 3/0304 345/156 |

FOREIGN PATENT DOCUMENTS

WO  2011/067292 A1  6/2011
WO  2012/025579 A1  3/2012

OTHER PUBLICATIONS

Jan. 5, 2016 International Preliminary Report on Patentability issued in International Patent Application No. PCT/EP2014/064369.

* cited by examiner

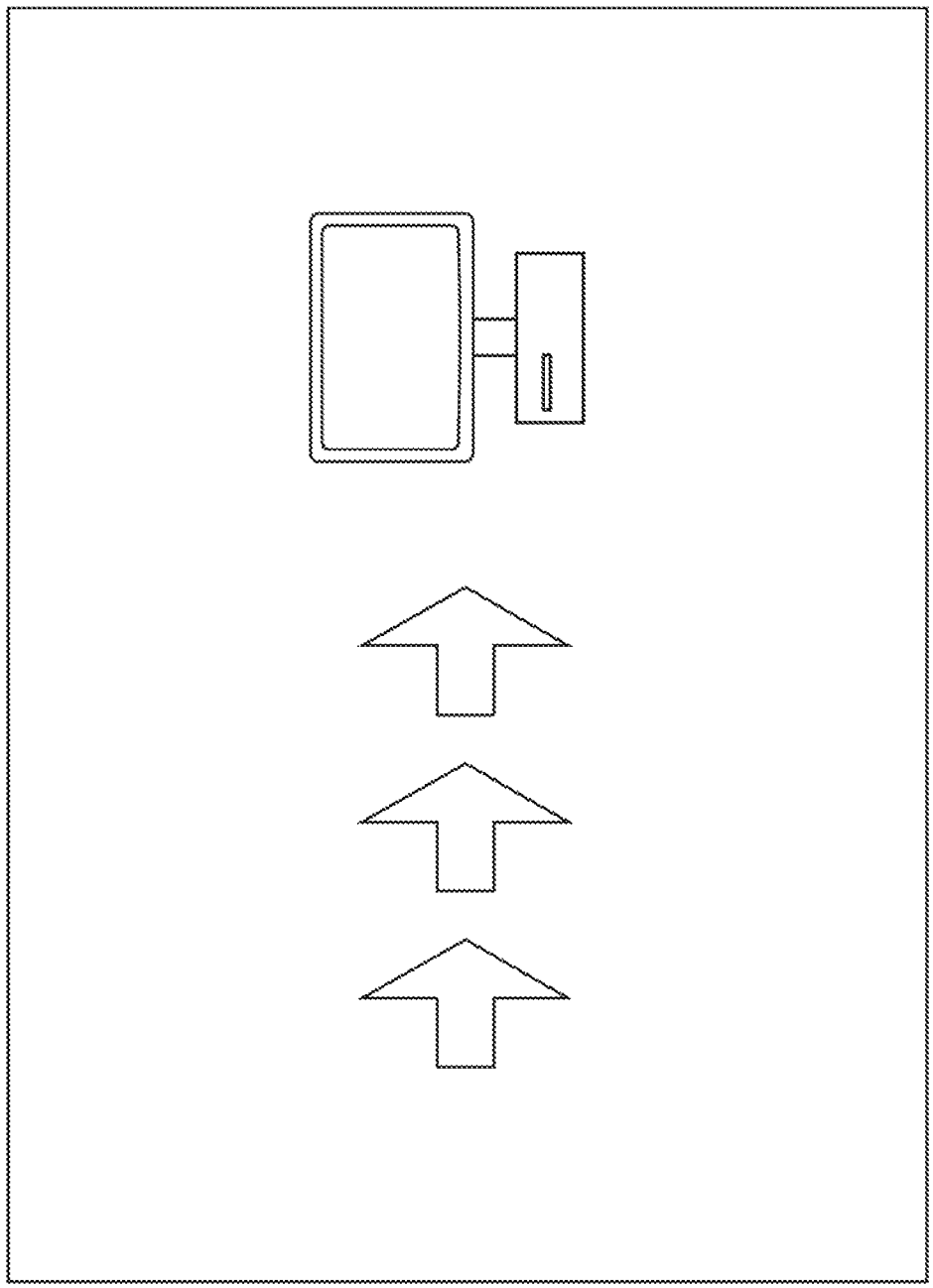

| Team member 1 | Prepare order 20 €19.95 | Prepare order 21 €16.75 | Prepare order 22 | Prepare order 30 € |
|---|---|---|---|---|
| | 1 Medium french fries | | | |
| | 1 SMALL french fries<br>1 SMALL beverage<br>1 LARGE beverage<br>1 Chocolate dessert<br>1 Caramel Dessert<br>2 Maxi Sandwiches<br>1 MEDIUM french fries | 1 Bacon sandwich<br>1 Chicken sandwich<br>1 Mineral water<br>1 Medium beverage<br>1 Expresso<br>1 Vanilla shake | | |

200 — 1 Medium french fries

201 — 2 Maxi Sandwiches / 1 MEDIUM french fries 20 (brace over Prepare order 21, 22, 30)

Fig. 4

METHOD OF ASSEMBLING ORDERS, AND PAYMENT TERMINAL

The present application claims the priority of the Swiss application CH1204/13 filed on Jul. 4, 2013, the content of which is included by way of reference.

TECHNICAL FIELD

The present invention concerns a method of assembling orders, notably a method of assembling orders in a restaurant such as a fast food restaurant, or the assembly of orders for other articles, for example from a dispatch center for articles sold by mail order, or the assembly of the components of products in a factory or an assembly or production center. The present invention also concerns a payment terminal, particularly a fixed payment terminal for a restaurant.

PRIOR ART

The preparation of an order in a restaurant usually comprises two distinct phases, that is to say taking of the order and assembly of the order. The assembly of the order may itself be made up of assembly in the kitchen (preparation of dishes, sandwiches, salads, etc.) and assembly of the finished or semifinished products (beverages, ices, etc.), including those possibly assembled in the kitchen.

The order can be taken by a waiter at the table of guests, at the car of the customer in a drive-thru restaurant, at the counter from a team member generally next to the payment terminal, in advance by telephone or by Internet, etc.

When the order is assembled, one or more team members will fetch the article or the various articles that makes or make up an order so as to gather them together and give them or send them to the customer.

BRIEF SUMMARY OF THE INVENTION

One aim of the present invention is particularly to facilitate this assembly process and to make it more reliable. Another aim is to facilitate the terminal for taking orders and to make it more reliable.

According to the invention, these goals are attained by virtue of the characteristics of the independent claims. Preferred embodiments are indicated in the dependent claims.

BRIEF DESCRIPTION OF THE FIGURES

Examples of implementation of the invention are indicated in the description illustrated by the appended figures, in which:

FIG. 3 illustrates a screen of a fixed payment terminal when assembling the order, or at the start of this assembly.

FIG. 4 illustrates a screen of an order assembly terminal when assembling the order.

Some figures illustrate screens with texts, for example texts in French, so as to more realistically reproduce the display of these screens. However, it goes without saying that texts in another language, or even screens without text, can be displayed.

EXEMPLARY EMBODIMENT(S) OF THE INVENTION

The first step in the preparation of an order comprises taking the order so as to enter it into a computer processing system, for example into a computer processing system including a fixed payment terminal.

The order can be taken and entered into a computer processing system by means of a keyboard, a touch screen or a voice recognition system, for example. The order can be taken on a fixed payment terminal, for example on the payment terminal that issues the till receipt for the customer and that can comprise a payment card reader and/or a drawer for the money in the case of cash payment. The order can also be taken remotely on another fixed or mobile terminal connected to this fixed payment terminal.

The application WO2011/067292A1, the content of which is included by way of reference, describes a terminal for taking an order that is intended to be used by a waiter in order to take an order and transmit it to the kitchen. The device uses a mobile terminal and a voice recognition system in order to recognize the articles or positions of menus making up the order. This device, as well as other devices such as touch screens, payment terminals with voice recognition, can be used within the context of the invention for taking orders.

The application WO2012025579A1, the content of which is included by way of reference, describes a method of robust voice recognition even in a noisy environment that is adapted, for example, to the recognition of meal orders taken verbally. This method can be used, by way of example, within the context of the invention for all steps of voice recognition both when taking the order and during assembly.

Figure 1:
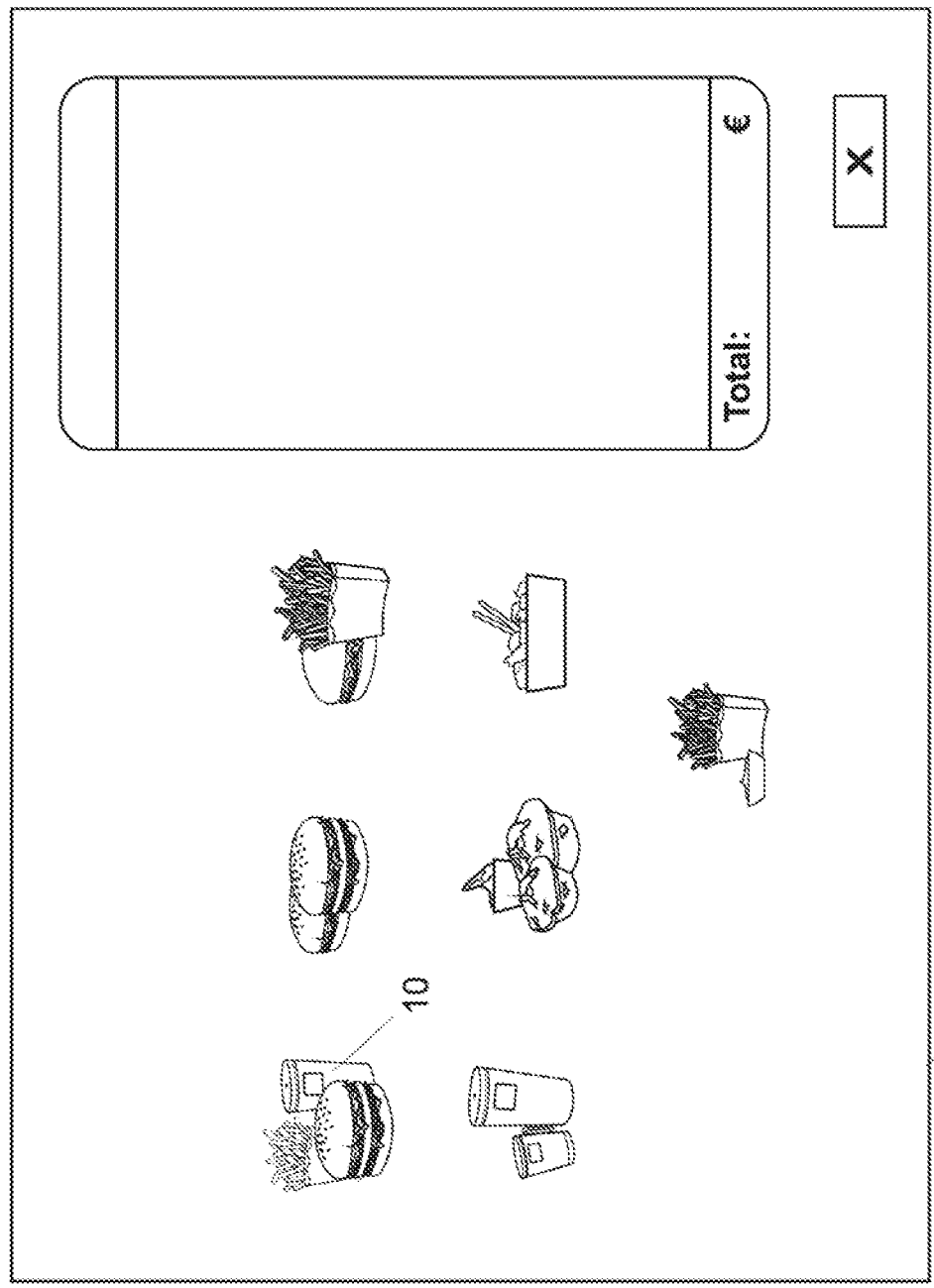
FIG. 1 illustrates an example of a screen of a fixed payment terminal when taking an order.

FIG. 1 illustrates an example of display on a payment terminal that can be used to take the order. An article 10 can be chosen from the list of articles proposed on this screen by clicking on this article, by selecting it with a finger in the case of a touch screen, or using a voice command, for example by saying the name of the article in the case of a payment terminal equipped with a voice recognition system. In the case of a voice recognition system, the available articles are not necessarily displayed for selection. The payment terminal can include a directional microphone network for capturing the voice of the team member who inputs an order.

Figure 2:
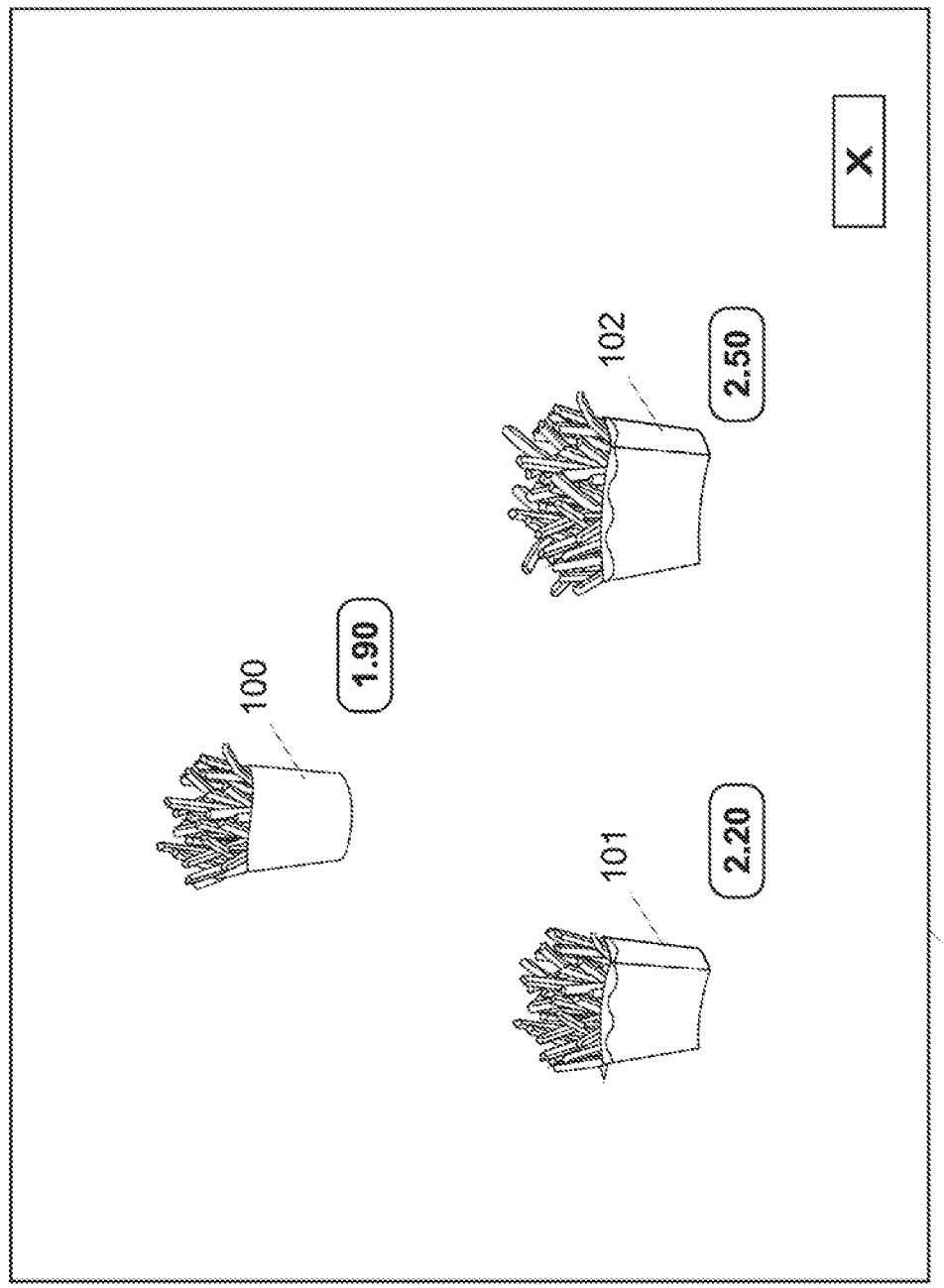
FIG. 2 illustrates an example of selection between different variants of one and the same article when taking the order.

FIG. 2 illustrates a substep of selection of one and the same article between different variants 100, 101, 102 (for example different sizes), at the time of the order. The options 100-102 are displayed and can be selected, for example by saying their name or by touch.

The order can also be taken by directly saying a plurality of products with options ("with/without tomatoes", etc.), whether or not they are displayed on a screen for taking an order. The team member can also say commands such as "Open table 25", "Table 30 bill", etc.

Assembly is typically carried out in the kitchen, or near to the kitchen. It can be carried out using one or more assembly screens different than the screen of the payment terminal. It can also be carried out using the screen that is already used to take the order and/or for payment on the payment terminal. FIG. 3 illustrates the screen at the start of preparation of the order.

FIG. 4 illustrates the assembly screen during assembly. This screen displays a plurality of orders side by side, in this example three orders, denoted in this case by order numbers 22, 23 and 30. The various orders can be displayed simultaneously or successively. Each order contains a list of articles 20. The top part 200 of each order indicates the articles that a team member has not yet picked, and the bottom part 201 indicates the articles that the team members have already picked.

The assembly screen can simultaneously display a plurality of orders from a plurality of team members. Each order C1 to C3 can be attributed to a team member, for example by means of a color code corresponding to each team member or user when this user connects to the system. It is also possible to use this color to indicate which user has picked each article of the order in order to perform assembly. A plurality of team members can also collaborate on the assembly of one and the same order.

Figure 5:
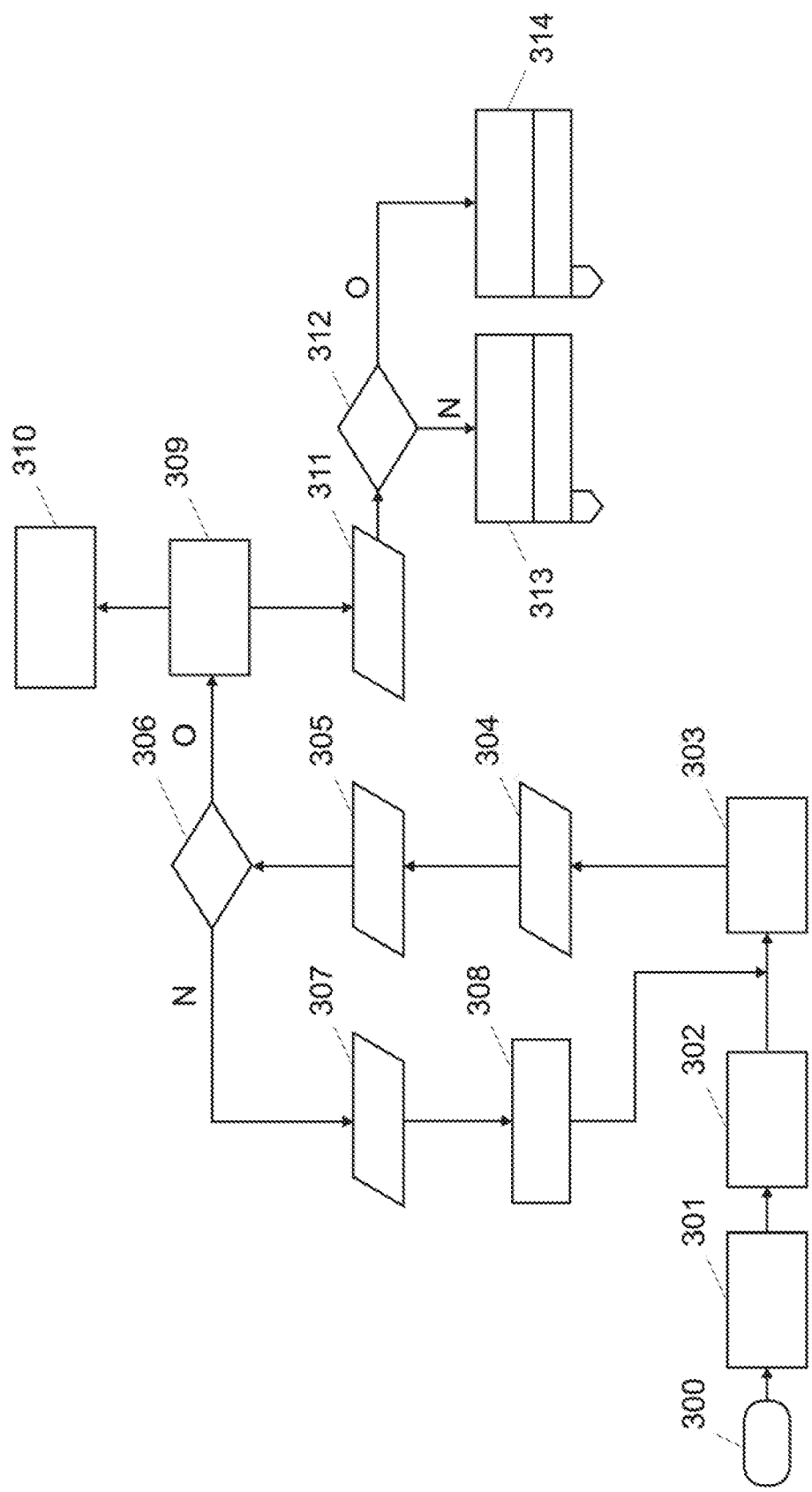
FIG. 5 is a flowchart showing the login process for a team member on the assembly terminal or the payment terminal.

FIG. 5 illustrates the method that a team member uses to register on the terminal of the assembly screen. The method begins in step 300. In step 301, the user (team member) takes a mobile terminal, for example a PDA or smartphone with a headset, and then launches a client application in the course of step 302. In the course of steps 303 to 308, the user identifies himself by means of his user name and optional password; alternatively, he could also identify himself by means of a biometric method, for example using his voice. A piece of speaker recognition software can be used in order to check whether the voice of the team member who speaks corresponds to the known voice of this team member. Other identification means can be used.

More specifically, at 303, the user uses his PDA to enter his user name and his password, which are transmitted in step 304 to the assembly terminal for processing in the course of step 305 so that the order preparation software checks whether they are valid in the course of step 306. If they are not valid, the method moves to step 307 (detection of invalid user name and/or password) and then displays an error message in the course of step 308, before returning to step 303 in order to request another user name and/or password.

A plurality of team members can log in on the same assembly terminal. If these team members work simultaneously, it is possible to automatically recognize which of the team members logged in speaks at each instant, for example by means of a piece of speaker recognition software, RFID, QR code, or using the identification of the computer connection of the mobile terminal of the user. A similar method can be used in order to allow each team member to connect to the payment terminal.

When a user is recognized, a color is attributed to him in the course of step 309, which color is displayed on the assembly screen in the course of step 310. The software of the PDA reads the valid login in the course of step 311, and then checks in the course of step 312 whether a valid user profile is associated with this user. If this is the case, voice models can be loaded in the course of step 314, and the interface for taking a voice order is started up. Otherwise, a voice training session is proposed in the course of step 313.

In one variant, the voice recognition can be carried out independently of the speaker.

Figure 6:
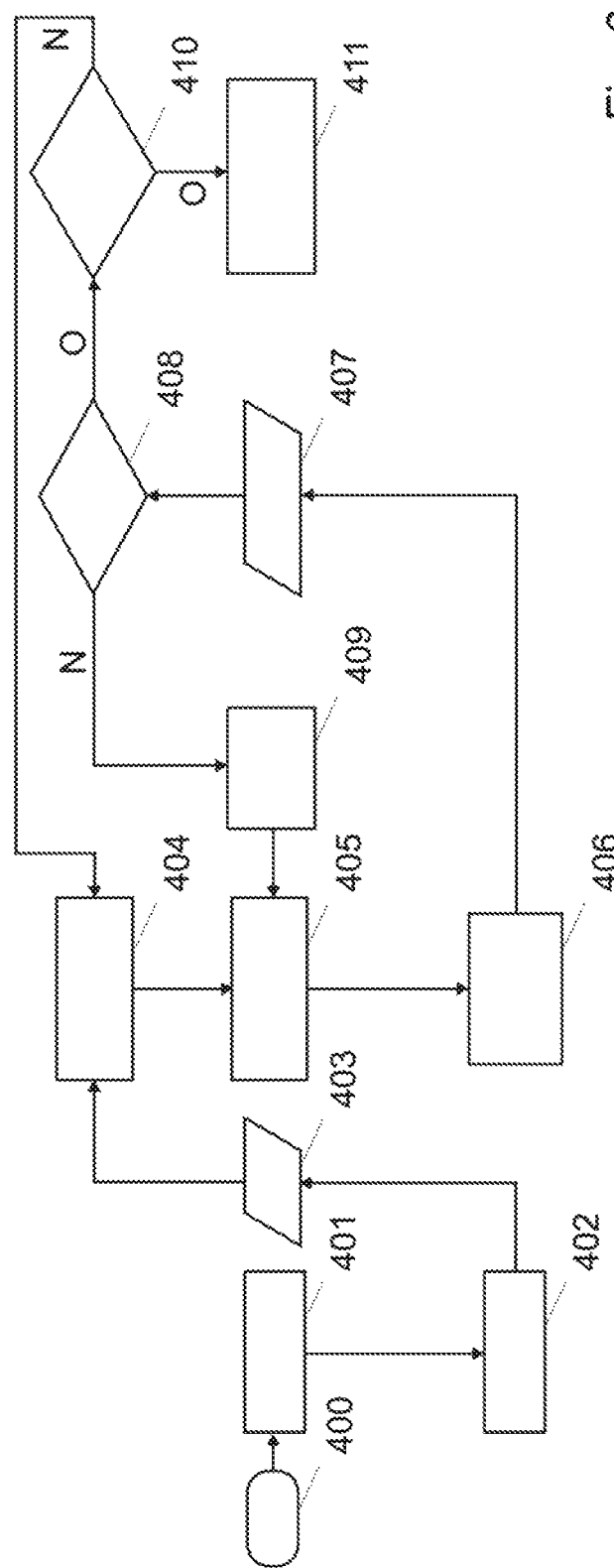
FIG. 6 is a flowchart showing the training process for a voice profile by a team member by means of a mobile terminal such as a PDA.

FIG. 6 illustrates an example of training for the voice profile of a team member from a mobile terminal. In this case, training the voice recognition system to recognize the voice of a team member involves listing one or more articles and orders by means of distinct voice commands. A similar training method can be used to enter orders by voice using a payment terminal equipped with a microphone and a piece of voice recognition software (which can operate on the terminal or on a remote computer/terminal). The team member does not need to touch the screen or the key pad of the payment terminal, or at the very most for some interventions for interrupting/resuming training or deleting a recording, for example. The words for training the voice profile scroll past and the team member merely has to read them. The next word is displayed when the team member has said the current word. A voice detection system (Voice Activity Detection) that allows operations to be linked in hands-free mode.

The method of FIG. 6 begins in step 400. In the course of step 401, a training screen is displayed on the screen of the PDA of the user, which invites the user to start the training for his voice profile in the course of steps 402 and 403.

In the course of step 404, the software then loads the first article or the first command in the list of articles and voice commands to be trained.

In the course of step 405, the loaded article or the loaded command is displayed (for example "hamburger" or "prepare order") on the screen of the PDA.

The user then reads the command or the article displayed in the course of step 406. The reading of the command or of the article is recorded in step 407 and the recording is displayed using a chart (for visual inspection by the user) and checked in step 408 so as to ensure that it is not cut off at the start or at the end or that it does not have too much breath produced by the speaker. If the recording is not considered good at the time of this checking process, the PDA asks for the article or the command to be repeated (step 409) and returns to the menu of step 405 with fresh display of the article or command that the user is invited to repeat; when all the words to be trained have been said by the user, the software checks in the course of step 410 whether the article or the command that has been read is the last in the list of articles or commands to be trained. If this is the case, the PDA displays an end of training session message (step 411).

At the end of the process of training of the voice profile, the user is invited, if he so wishes, to validate his profile. To do this, he has to read, in a "hands free" process similar to that performed when training his voice profile, a list of a few phrases that is made up of complete voice commands, such as: 1 hamburger without gherkins; all ketchups, all sauces for fries; 3 Diet Coke without ice; etc. The phrases that are read are sent to the voice recognition software, which answers whether or not each phrase is recognized correctly. A green chart is displayed if the phrase is recognized, red if it is not. A score of the success rate is displayed and recorded at the end of the process of validation of the voice profile.

An order can be taken at the counter on the payment terminal, or at the table, or at the car by means of a PDA, for example. It can be taken by means of voice commands, for example. The entered order can be attributed to the team member who has taken it. A customer can also enter an order (in this case he will not necessarily be identified if he is not yet recorded in the system). If necessary, the team member or the customer can also use his hands, his eyes or any other means to control triggering/stopping of the microphone and of the voice recognition.

As mentioned, orders can also be input by means of selection on a screen, for example a touch screen as illustrated in FIGS. 1 to 3.

If a plurality of team members share the same terminal, they can be automatically distinguished from one another by means of their voice, an RFID identifier, facial recognition, a QR code or any other identification means not requiring physical contact.

Figure 7:
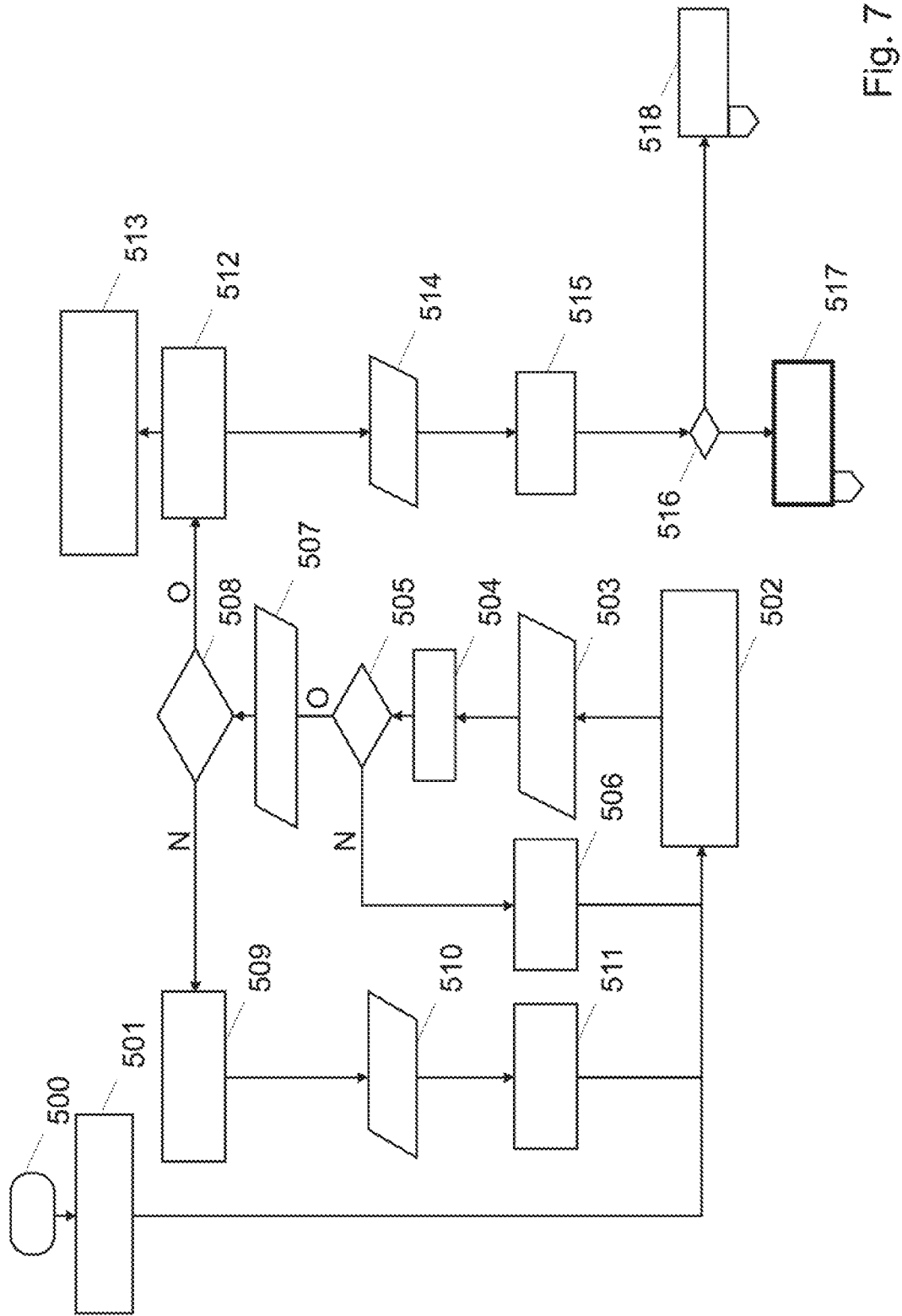
FIG. 7 is a flowchart showing the start of the assembly process and the announcement of the name of the order to be assembled.

FIG. 7 illustrates the start of the process of assembling an order. This process begins in step 500. In the course of step 501, the names or identifications of the orders in progress are displayed on the assembly screen; each order is associated with a name or identifier, for example a proper noun, a name of a color or another identifier. Since the number of orders that it is possible to display and assemble simultaneously on the assembly screens is limited, it is possible to assign an "assembly" name to each order, which makes it possible to reduce the number of names or order numbers to a smaller set.

In the course of step 502, the user (team member) who wishes to assemble an order gives a corresponding voice command, for example "prepare order"+"order identifier", for example "prepare order 23" or "prepare orange order". This voice command is recorded in the course of step 503 and recognized by the voice recognition software, for example on a server or a PDA, in the course of step 504. The user speaking can moreover be recognized. The orders are preferably not attributed exclusively to one team member, a plurality of team members can contribute to assembling an order together. The team members can be identified by means of the identification of the connection of their mobile terminal in the case of a mobile system, or by means of the method of identification of the fixed system (facial recognition, RFID, QR code, etc.).

If the recognition has not worked or the confidence index is insufficient (test 505), the PDA or the assembly terminal/screen can display or use voice reproduction for a message in order to request repetition of the voice command in the course of step 506.

In the opposite case, that is to say when the voice command is recognized with sufficient confidence (step 507), the software checks in the course of step 508 whether the voice command received is a valid command in relation to the current state of the assembly process (valid articles in an order, sufficient quantity, preparation of the bag that is being assembled finished, etc.). Invalid voice commands are processed by the preparation software in the course of step 509, then in the course of step 510, which prompts feedback for the user in the course of step 511, for example a high-pitched "beep beep beep" audio signal, a message displayed on a screen, or possibly nothing (as the user quickly realizes that he has to perhaps repeat what he has said).

Valid voice commands are for their part processed by the processing software in the course of step 512, which generates, in the course of step 513, display of the name of the user on the assembly screen in his color next to the order, or another indicator allowing this user to be associated with this order. The software of the PDA is then informed of the valid voice command in the course of step 514, and an appropriate feedback signal is reproduced in the course of step 515, for example a low-pitched BEEP audio signal, or nothing. The user can then check, in the course of step 516, the order that has been recognized and that can be displayed, and can indicate any error in the course of step 518; otherwise, he can begin to pick an article for assembly of the order in the course of step 517.

Figure 8:
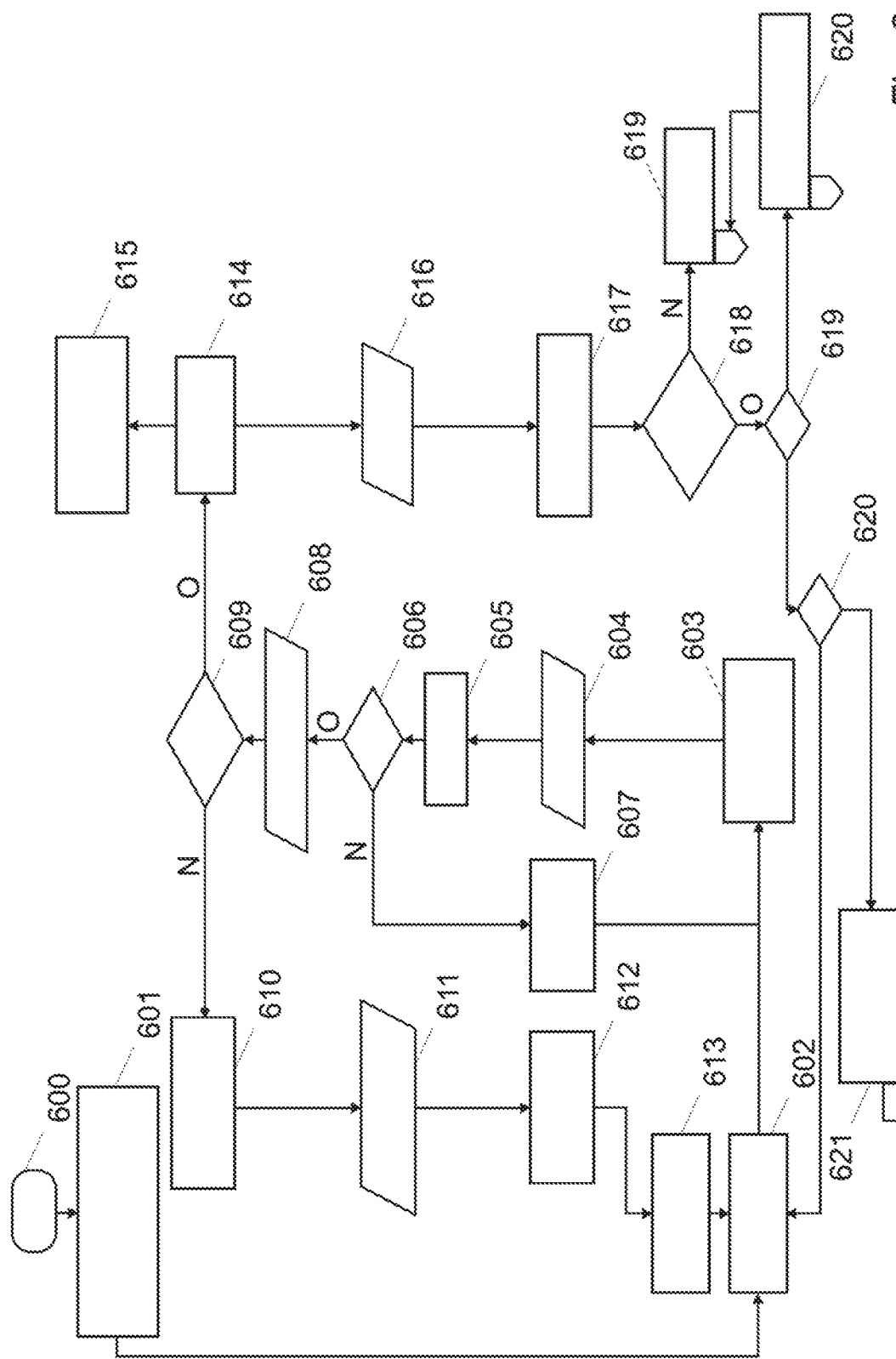
FIG. 8 is a flowchart showing the picking of an article in the course of the assembly process and the announcement of the name of a picked article.

FIG. 8 illustrates product picking during assembly. The method begins at step 600. In the course of step 601, the name of the user is displayed on the assembly screen, alongside the order that he is in the process of assembling together with the list of all the articles making up this order. In the course of step 602, the user picks an article of this order indicated on the assembly screen, and then states in the course of step 603 the quantity picked and the name of this article (for example "1"-"hamburger". The article picked can be stowed or placed in a predefined location, for example in a packet, in a bag, on a tray, etc. The article may possibly comprise options (without ice, red grill, etc.) and/or a unit (liter, kg, etc.). The stating of the quantity when picking a product could also be optional so as to allow the team member to state just "hamburger".

This voice command is recorded in the course of step 604, and then recognized in the course of step 605. If recognition has not worked (test 606), an audio and/or visual message is reproduced in the course of step 607, for example "repeat please". If on the contrary the voice command is recognized (608), a test of validity of the command is performed in the course of step 609, to check the "operational" validity of the order.

When the order preparation software determines that the voice command is not valid (610), the software of the user's PDA and/or the assembly terminal/screen processes this situation in the course of step 612 and optionally reproduces an error signal/message for the user, for example a high-pitched audio signal "Beep Beep Beep" and thus invites the user to replace the unrecognized article (613). When, on the contrary, the voice command is valid (614), this article is associated with the user's identifier (step 615), for example by being displayed with the color associated with this team member. The article picked is marked as such on the assembly screen, for example by moving the article indication from an article-to-be-picked area to a picked-articles area or simply by marking the picked article with the color of the team member without moving it. The software of the user's PDA then processes in the course of step 616 this valid article situation (616) and reproduces a feedback signal (step 617), for example a low-pitched audio signal "BEEP", the display of a message or optionally does nothing.

The user can thereafter check in the course of step 618 whether the article displayed is indeed the one that he picked and whose name he stated (test 618). It is possible in a variant to check whether the article picked is the right one, for example by reading a barcode, an RFID tag, etc. In the converse case, an error processing routine is started in the course of step 619, for example by typing or stating an error processing command.

If the article displayed is indeed the right one, a test is performed in the course of step 619 to check whether the article picked is the last article of the order; when this is not the case, the program passes to step 620 in the course of which the user can either choose to continue assembling the order in progress by returning to step 602, or pass to the assembly of another order by stating in the course of step 621 a voice command to change order, for example "prepare order 33". When on the other hand the last article of the order has been picked, the program passes to step 620 to end the order and print the order receipt.

Figure 9:
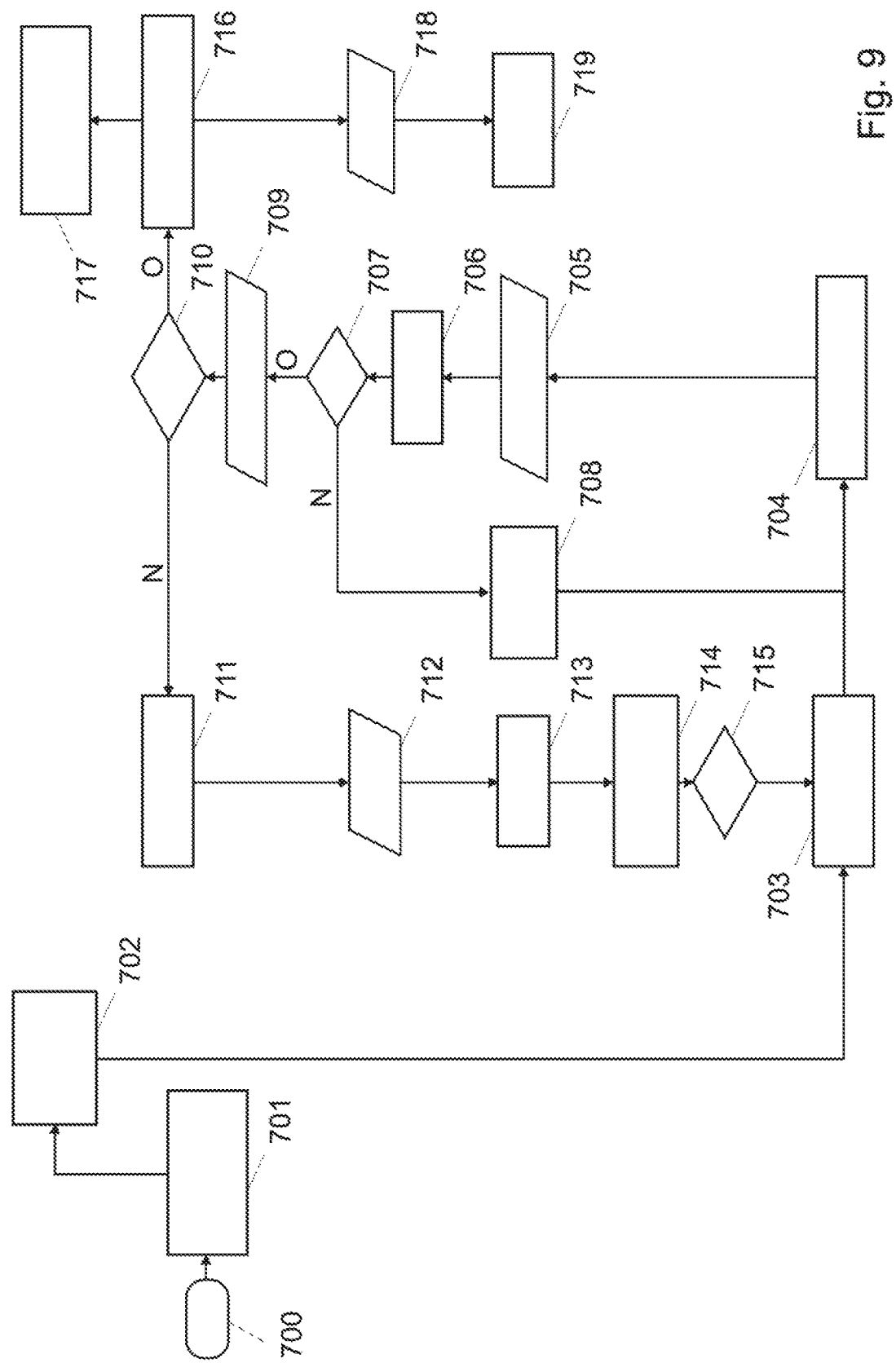
FIG. 9 is a flowchart showing the withdrawal of an article already picked in the course of the assembly process, for example following cancellation by a customer.

FIG. 9 illustrates the withdrawal of an already picked article, for example when a customer cancels an article order. The method begins at step 700. In the course of step 701, an already assembled article is withdrawn from the order by the order preparation software; this removed article flashes in the course of step 702 on the assembly screen, or is signaled in some other way. The user (team member) then withdraws in the course of step 703 the article from the bag or tray corresponding to the order whose article is withdrawn, and then states in the course of step 704 an article withdrawal voice command, for example "an"-"ice tea"-"withdrawn".

This voice command is recorded in the course of step 705, and then recognized in the course of step 706. If recognition has not worked (test 707), an audio and/or visual message is reproduced in the course of step 708, for example "repeat please". If on the contrary the voice command is recognized (709), a test of validity of the command is performed in the course of step 710, to check the operational reality of the voice command recognized.

When the order preparation software determines that the voice command is not valid (711), the software of the user's PDA processes this situation in the course of step 712 and reproduces an error signal for the user, for example a high-pitched audio signal "Beep Beep Beep" (713) and thus invites the user to put back the article withdrawn by error in the bag or on the tray (714). The cause of the error can be checked in the course of step 715.

When, on the contrary, the voice command is valid (716), this article ceases to flash (step 717). The software of the user's PDA then processes in the course of step 718 this situation of validly withdrawn article and reproduces a feedback signal (step 719), for example a low-pitched audio signal "BEEP".

Figure 10:
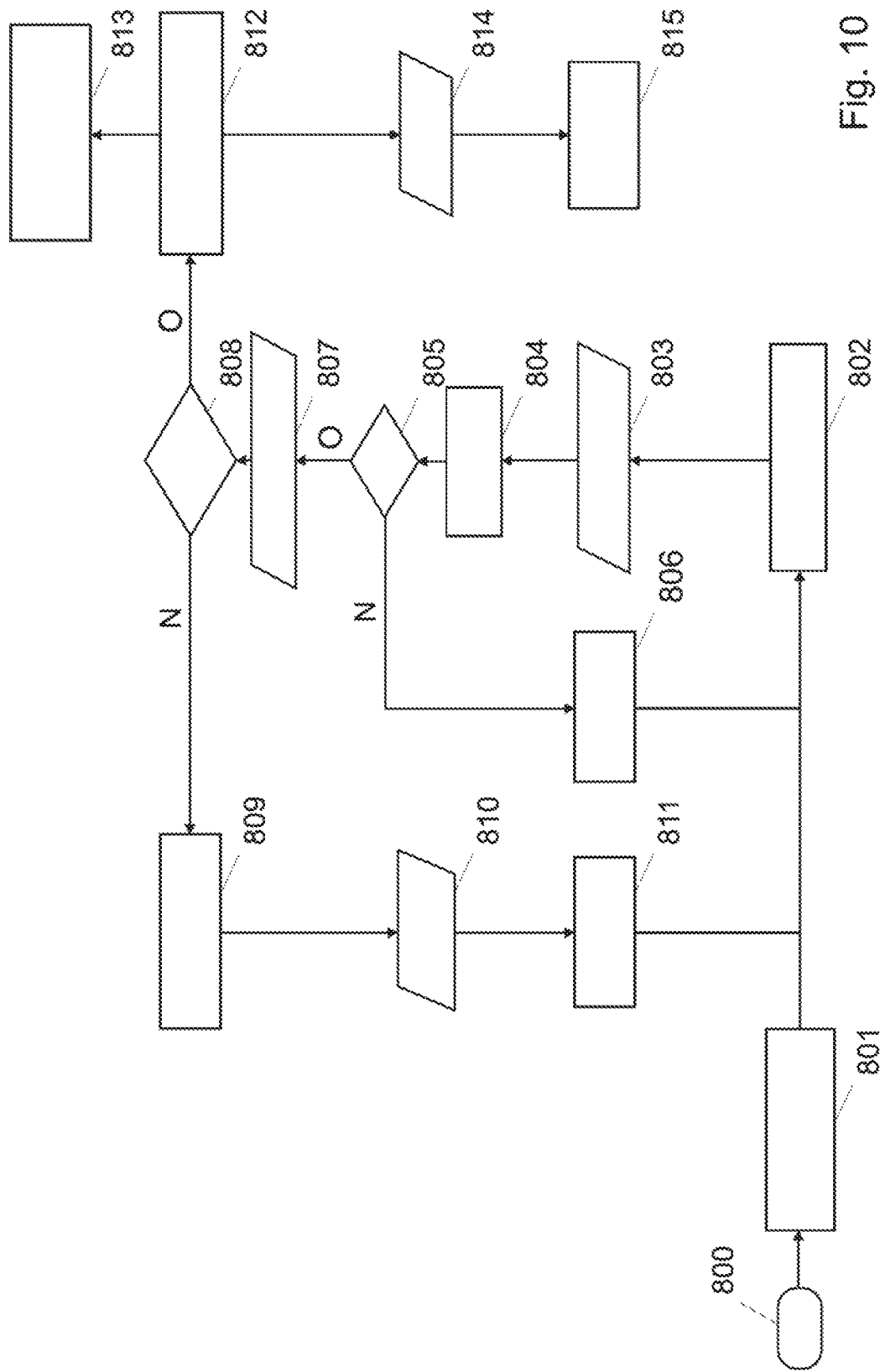
FIG. 10 is a flowchart showing the withdrawal of an article already picked in the course of the assembly process, for example following the decision by a team member.

FIG. 10 illustrates the withdrawal of an already picked article following a decision by the team member. The method begins at step 800. In the course of step 801, the user (team member) withdraws in the course of step 802 an article from the bag or tray corresponding to an order, and then states in the course of step 704 an article withdrawal voice command, for example "an"-"ice tea"-"withdrawn".

This voice command is recorded in the course of step 803, and then recognized in the course of step 804. If recognition has not worked (test 805), an audio and/or visual message is reproduced in the course of step 806, for example "repeat please". If on the contrary the voice command is recognized (807), a test of validity of the command is performed in the course of step 808, to check the operational reality of the voice command recognized.

When the order preparation software determines that the voice command is not valid (809), the software of the user's PDA processes this situation in the course of step 810 and reproduces an error signal for the user, for example a high-pitched audio signal "Beep Beep Beep" (811) and thus invites the user to repeat the invalid voice command by returning to step 802.

When, on the contrary, the voice command is valid (812), this article is no longer displayed in the color of the user (step 813). The software of the user's PDA then processes in the course of step 814 this situation of validly withdrawn article and reproduces a feedback signal (step 815), for example a low-pitched audio signal "BEEP".

Figure 11:
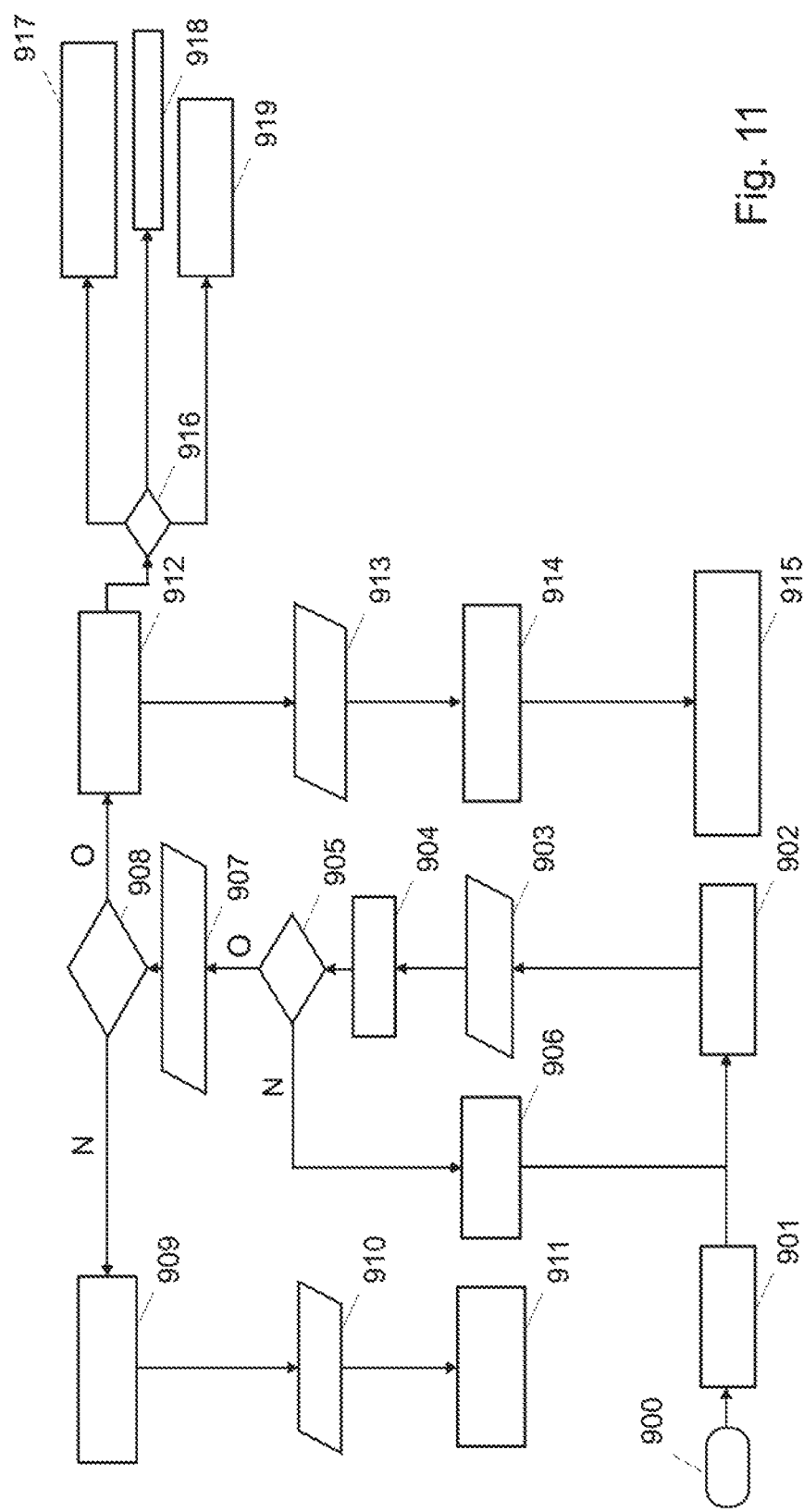
FIG. 11 is a flowchart showing the end of a partial or possibly complete step of the process of assembling an order, comprising the optional printing of a ticket corresponding to the list of products picked by the team member for the order and placed into a bag, a box, a carton, on a tray, etc.

FIG. 11 illustrates the end of the assembly of an order or of a part of an order (bag, packet, etc.), which comprises in this example the printing of a label to mark the packet or the bag containing the assembled products. This step allows a user to print a receipt comprising the list of products that he has picked up until then for the order in question, and to stick it on the bag into which he has put the products to be assembled as and when he picked them. As an option, when printing the last "Bag Receipt" of the order, it is possible to print an "order receipt" with the list of all the products of the order. An order can be made up of a plurality of bags or packets with their corresponding receipt.

A user can verbally indicate the partial assembly of an order (bag, box, carton, etc.), the articles picked by this user then being grouped together in a symbolic unit (bag 1, bag 2, etc.) on the assembly screen so as to free some room on the assembly screen and allow better viewing of the "still to do".

The end of assembly of an order can be detected automatically without particular action on the part of the team member if the last partial assembly of the order has been performed.

This process begins at step 900. In the course of step 901, the user closes the bag containing a part (or all) the products of an order, or transmits the tray to the customer or to the waiter. In the course of step 902, he states a voice command of end of bag/packet/tray, for example "bag receipt". A team member can assemble a few products of an order A ("prepare Order A", "1 Hamburger, 1 Medium Fanta Without Ice", "Bag Receipt"), continue by assembling products of order B ("prepare Order B", "1 Ristretto, 1 Hot Chocolate", "Bag Receipt"), and then go back to order A.

This voice command is recorded in the course of step 903, and then recognized in the course of step 904. If recognition has not worked (test 905), an audio and/or visual message is reproduced in the course of step 906, for example "repeat please". If on the contrary the voice command is recognized (907), a test of validity of the command is performed in the course of step 908, to check the operational reality of the voice command recognized.

When the order preparation software determines that the voice command is not valid (909), the software of the user's PDA processes this situation in the course of step 910 and reproduces an error signal for the user, for example a high-pitched audio signal "Beep Beep Beep" (911) or a message displayed on a screen.

When, on the contrary, the voice command is valid (912), a bag/packet receipt, and optionally an order label, is printed so as to be stuck on the bag/packet/order. This label may for example indicate the order number, the number of the bag or of the tray, the date and time of printing, etc. The end-of-order receipt may for example include the order number, the number of bags, a barcode, the number of beverages, etc.

In parallel, the order preparation software checks in the course of step 916 whether the order is complete; when this is the case (917), the till receipt and/or the label of the bag is printed in the course of step 917. A receipt is also printed when articles still remain to be assembled but the user has anticipated the end of the order (919). As an option, remaining articles not yet assembled can be parked (918). The temporary parking of a partially assembled order can be requested so as to wait for an ordered article to be available.

The program can comprise a processing of voice recognition error detected by a team member. The detection of such an error can be used to improve the voice recognition model; this model may be dependent on the speaker.

The program can comprise the processing of voice commands to request a pause or to resume a pause, so as to allow a user to interrupt momentarily and then to resume the voice recognition process and the assembly of an order.

To facilitate recognition of the various articles forming an order when taking the order or during assembly, the voice commands preferably obey a predetermined grammar. In one embodiment, the voice commands can be of various types which are distinguished from one another by their grammatical structure. It is possible to envisage for example the following types of voice commands:

Commands corresponding to an article (for example "1"-"ice tea"-"medium") One or a plurality of parameters can be indicated (for example "1"-"ice tea"-"+" "ice"-"+"-"lemon").

Simple order commands (for example "logout", "print ticket", "missing drinks", "pause", etc).

Dual order commands (for example "open table"-"5", "add it to table" "5", "prepare order" "orange"), etc.

The invention claimed is:

1. A method of verbally controlling an assembly terminal, the method comprising:
displaying a plurality of orders each including a plurality of articles successively or simultaneously on a screen of an assembly terminal;
inputting voice commands of various types into the terminal by a team member from among a plurality of team members, verbally designating one of the types of voice command corresponding to a designation of an article after having read an article identification on the assembly screen and then picked the physical article corresponding to this identification, the article designation including an indication of quantity, and/or an indication of unit, and one or more optional parameters, wherein an indicator of the team member is displayed on the assembly screen next to the order;
identifying, by a voice recognition system, the article designation indicated by the team member;
checking whether the article verbally indicated by the team member had already been picked previously for the same order;
in response to the article being not already picked previously for the same order, updating the order on the assembly screen so as to indicate that the article has been picked;
receiving another of the types of voice command corresponding to a cancellation order for the system, the cancellation order including a command for canceling the picking of the article by causing an update of the order on the assembly screen so as to indicate that the article previously marked as picked is no longer so, wherein
the grammar of the voice commands is predetermined and is based on the type of voice command.

2. The method as claimed in claim 1, in which the team member verbally announces the name of the order that he assembles.

3. The method as claimed in claim 1, in which the team member is recognized and in which the assembly screen indicates the team member or team members who is or are assembling each order.

4. The method as claimed in claim 3, in which the assembly screen indicates the team member who has picked each sought article.

5. The method as claimed in claim 4, in which a color is attributed to each user when he connects to the system, this color then being used to mark the articles picked by the user.

6. The method as claimed in claim 1, in which the team member verbally indicates the partial assembly of an order, the articles picked by the team member then being grouped together on the assembly screen.

7. The method as claimed in claim 1, in which the team member verbally indicates the end of the assembly of an order, the order concerned then disappearing from the assembly screen in order to leave space for a next order.

8. The method as claimed in claim 1, further comprising:
automatically checking as to whether the article verbally indicated by the team member who has picked the article is present in the order that is being assembled.

9. The method as claimed in claim 1, further comprising:
checking whether the picked article corresponds to the article designated by the team member.

10. The method as claimed in claim 1, wherein the article designation includes an article name and a code displayed on the assembly screen in order to designate special orders.

11. The method as claimed in claim 1, further comprising:
inputting a voice command for canceling or replacing an article in an order, the assembly screen removing or replacing the article concerned in the order concerned when the command has been recognized.

12. The method as claimed in claim 1, further comprising:
inputting the various articles of an order by selecting the various articles of an order via a voice command in a fixed terminal.

13. The method as claimed in claim 1, further comprising:
inputting the various articles of an order by selecting the various articles of an order via a voice command in a portable terminal of a team member.

* * * * *